Aug. 26, 1952 R. S. DEAN 2,608,463
AQUEOUS SOLUTIONS CONTAINING MANGANESE IN A COMPLEX
ION AND PROCESSES OF MAKING THE SAME AND
MAKING MANGANESE COMPOUNDS THEREFROM
Filed Oct. 29, 1948 8 Sheets-Sheet 1

System $Mn(OH)_2 - NH_4OH - HCl$, 10 g/L

Reginald S. Dean
INVENTOR

System $Mn(OH)_2 - NH_4OH - HCl$, 500 g/L

Reginald S. Dean
INVENTOR

Conductivity in System
MN(OH)₂-NH₄OH-HCl, 500 g/L
Variation Along 10% MN(OH)₂ Line System Mn(OH)₂ – NH₄OH – H₂SO₄, 500 g/L System Mn(OH)₂−NH₄OH−HNO₃

System Mn(OH)$_2$–NH$_4$OH–CH$_3$COOH

Cyclic Process For Making Manganese Hydroxide From MNO

Reginald S Dean
INVENTOR

Patented Aug. 26, 1952

2,608,463

UNITED STATES PATENT OFFICE 2,608,463

AQUEOUS SOLUTIONS CONTAINING MANGANESE IN A COMPLEX ION AND PROCESSES OF MAKING THE SAME AND MAKING MANGANESE COMPOUNDS THEREFROM

Reginald S. Dean, Washington, D. C.

Application October 29, 1948, Serial No. 57,376

19 Claims. (Cl. 23—51)

1

This invention relates to aqueous solutions containing manganese in a complex ion and to manganese compounds made from them. It relates especially to such solutions containing manganese and ammonia which find uses in recovering manganese from its ores and in making commercially useful compounds of manganese. It has for its aim the preparation of such solutions of different composition and properties than those heretofore known and possessing outstanding advantages for the uses enumerated and for other uses. It also has for its aim the provision of methods of decomposing the complex ions in the solutions and the production of manganese compounds thereby.

It has been heretofore known that manganous salts form complex cations with ammonium salts of the general formula $Mn(NH_3)_n^{++}$ where $n$ is a number up to 4. It has been generally recognized that ammonium salts, due to the formation of such cations and the suppression of ionization of ammonium hydroxide by the common ion effect, prevent the precipitation of manganous hydroxide from aqueous solutions of manganous salts by ammonia in certain concentration ranges.

Alkaline solutions of manganese and ammonium salts, based on the known art just cited, have been used for the recovery of manganese in the form of hydrated higher oxides by the oxidation of such solutions with air. It is generally recognized that the upper pH limit for clear solutions of the heretofore known and used solutions containing manganese and ammonium salts is about 8.5. As an example, Woodman and Jacobs have stated in Bureau of Mines R. I. 3681 that the upper limit of pH which may be reached in aqueous solutions of manganese and ammonium sulphate without precipitation of manganous hydroxide is 8.5.

For the preparation of higher manganese oxides, Bellone, U. S. 2,122,735, has disclosed solutions containing as a maximum of ammonia content 2 gram molecules of $MnSO_4$, 2 gram molecules of $(NH_4)_2SO_4$ and 6 gram molecules of $NH_3$ in 2 liters of aqueous solution. If this is calculated to the ternary system

$$Mn(OH)_2\text{---}NH_4OH\text{---}H_2SO_4$$

dissolved in water, we find that the proportions are 32.6 $NH_4OH$, 20.9 $Mn(OH)_2$ and 46.5 $H_2SO_4$ for a total concentration of 415 grams per liter.

The recovery of manganese from its ores by the so-called ammonium sulphate process has been disclosed in many United States patents, including Laury, U. S. 1,932,413 and Bradley, U. S.

2

1,951,341. The process has perhaps been most completely described by C. V. Firth in a report published by the Mining Experiment Station of the University of Minnesota, November 14, 1941, entitled "The Chemistry and Application of the Ammonium Sulphate Process." In that report the maximum ammonia concentration given may be calculated to the proportions in grams per liter, $Mn(OH)_2$ 16, $NH_4OH$ 38 and $H_2SO_4$ 46. It may be inferred that more ammonia may be added to such a solution without precipitation and if twice the ammonia were added, the proportions would be $Mn(OH)_2$ 13, $NH_4OH$ 55 and $H_2SO_4$ 32.

The low degree of complexity of the manganese ion in such solutions is indicated by the substantially complete precipitation of the manganese therefrom by carbon dioxide. This has been disclosed in U. S. 1,889,021, issued to Kenneth A. Kobe, and in more detail in the report by C. V. Firth, previously cited.

I have discovered a new and radically different group of manganese and ammonia complexes existing within certain concentration ranges of three component systems of manganous hydroxide, ammonium hydroxide and certain acids in aqueous solution.

The acids which form these complexes are characterized by their formation of manganese salts at least as soluble in water as manganous sulphide, that is about .0006 gram per liter. As exceptions from this general rule must be noted those acids, such as phosphoric and arsenic, which form insoluble manganese ammonium salts and such acids as tartaric and hydrocyanic which form complexes not containing ammonia. The composition ranges in which these new complex solutions occur are different with different acids but there is a definite pattern for the composition ranges in which they predominate.

The invention will now be described in greater detail, with reference to the accompanying drawings in which.

with a total concentration of components equalling 500 grams per liter at 25° C. and at atmospheric pressure.

Figure 5:
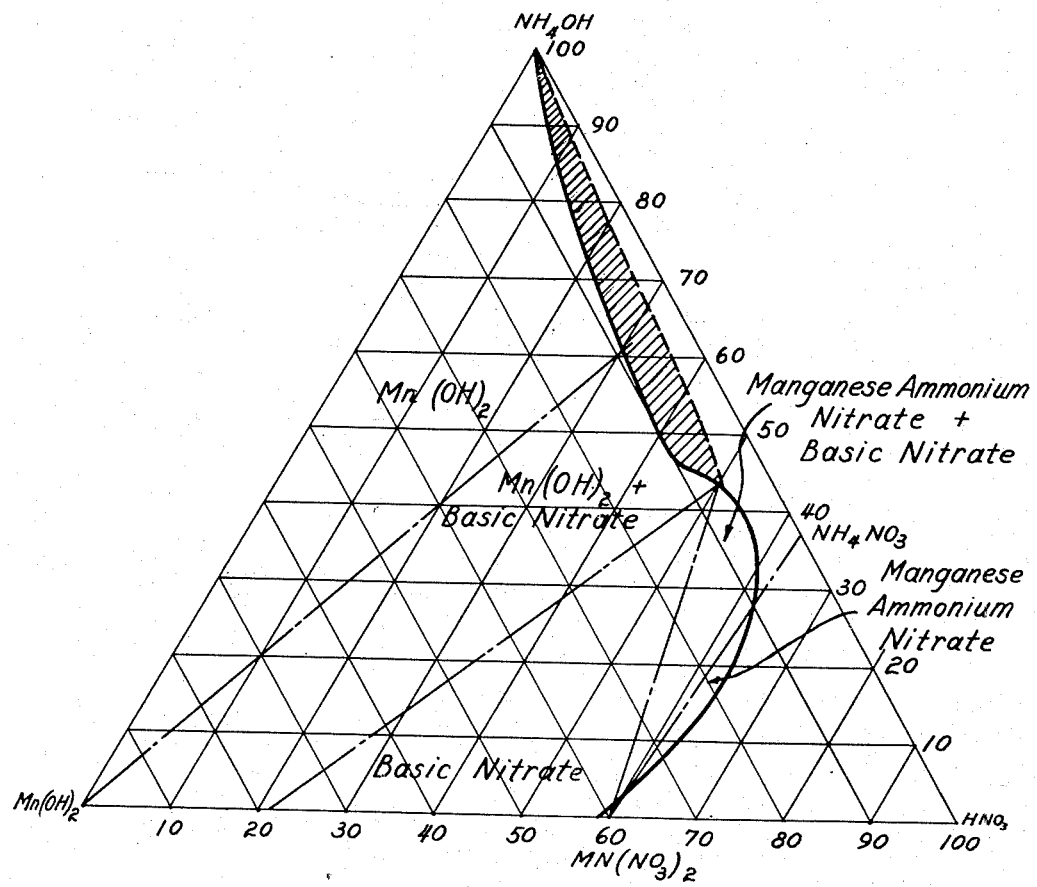
Fig. 5 is a ternary diagram representing the composition range for the system
Figure 6:
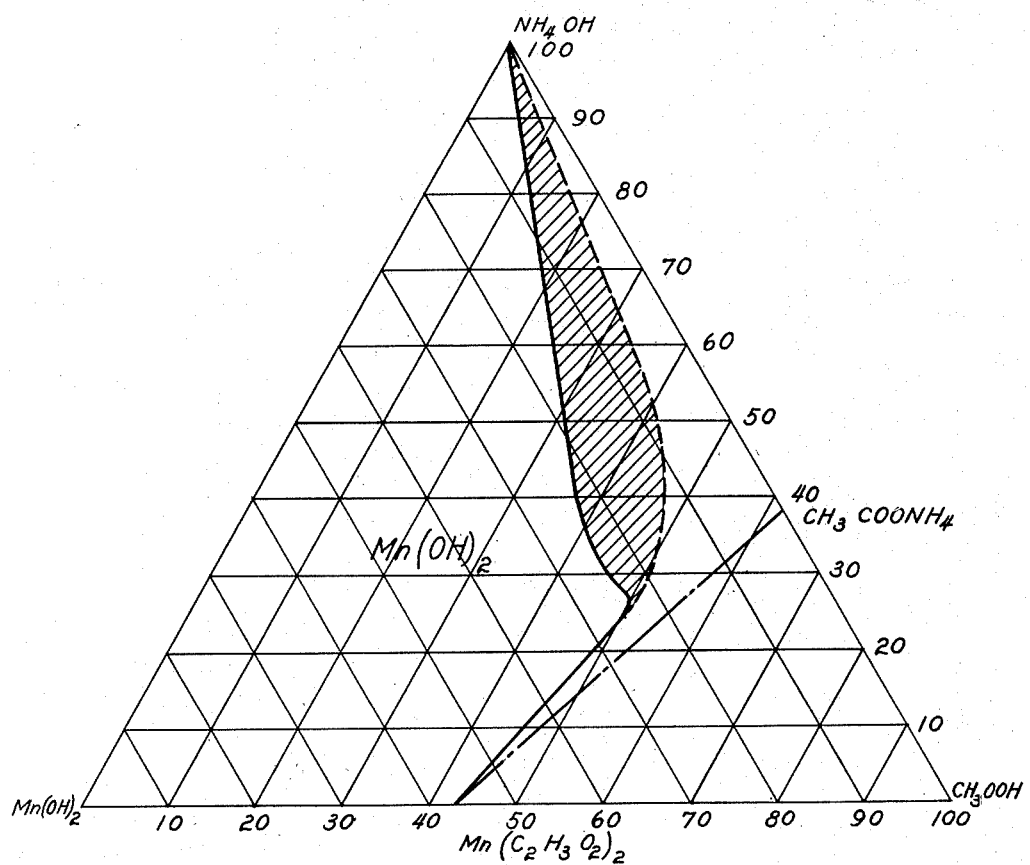

Fig. 6 is a ternary diagram similar to that of Fig. 5 except the acid component is acetic acid.

Figure 7:
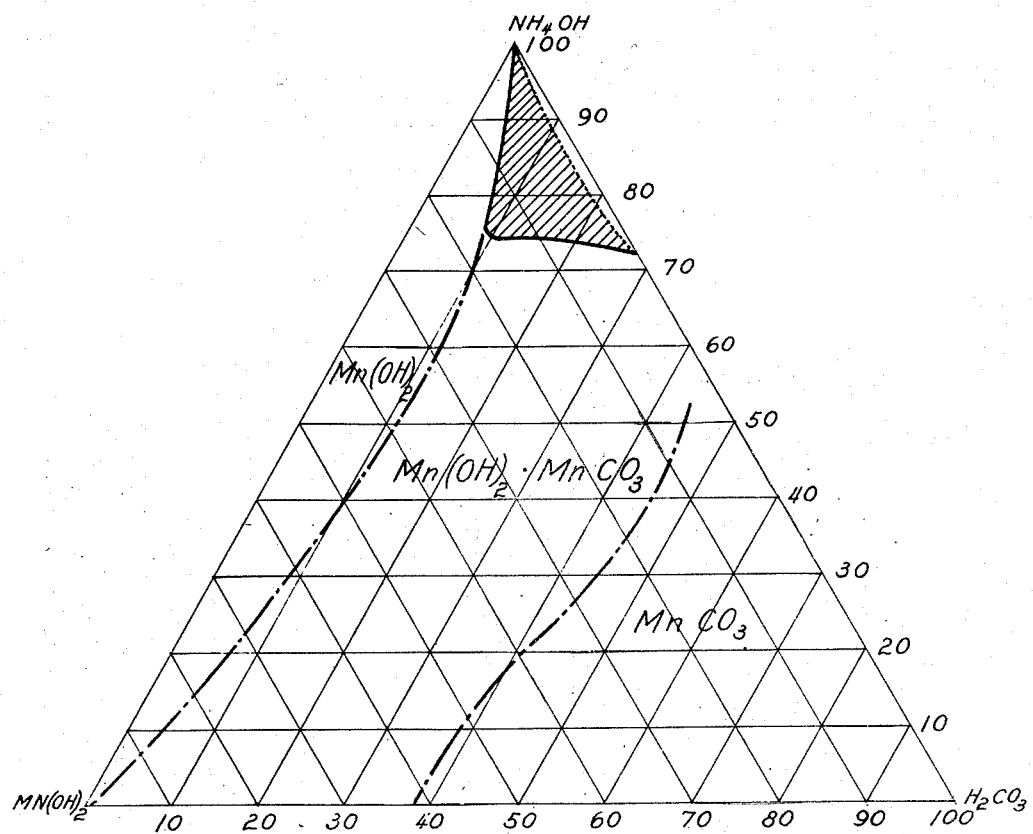

Fig. 7 is a ternary diagram representing the composition range for the system

with a total concentration of components equalling 500 grams per liter at 25° C. and at atmospheric pressure.

Figure 8:
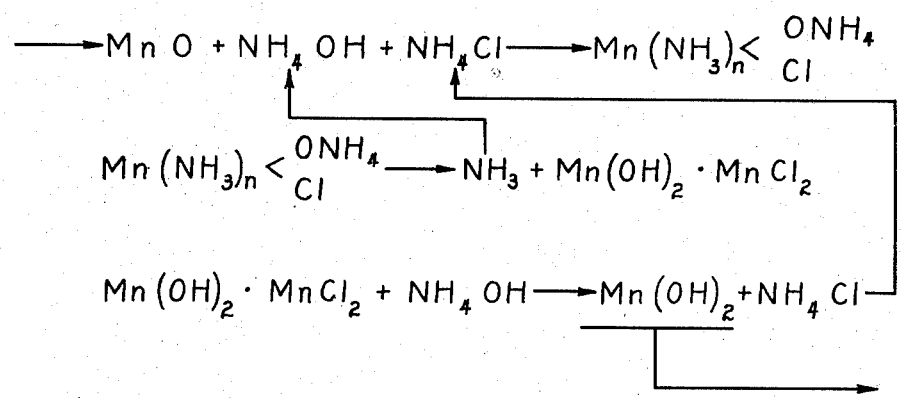

Fig. 8 is a flowsheet representing a cyclic process for making manganese hydroxide from MnO, NH₄OH and NH₄Cl.

This pattern and the composition range in which the new complex predominates in each system can best be made clear by a consideration, in the first instance, of the behavior of very dilute solutions of a typical three component system: manganous hydroxide, ammonium hydroxide, hydrochloric acid. Such dilute solutions do not form the new complex; they do, however, form the heretofore known cationic complexes and the precipitation of manganous hydroxide is displaced to higher ammonium hydroxide concentrations by the presence of ammonium salts. This situation is illustrated by the full line in Figure 1, which depicts a ternary system in which the sum of the three components equals 10 grams per liter dissolved in water at 25° C. The field to the left of the full line shows the proportions of the components other than water in which manganous hydroxide precipitates.

Figure 1:
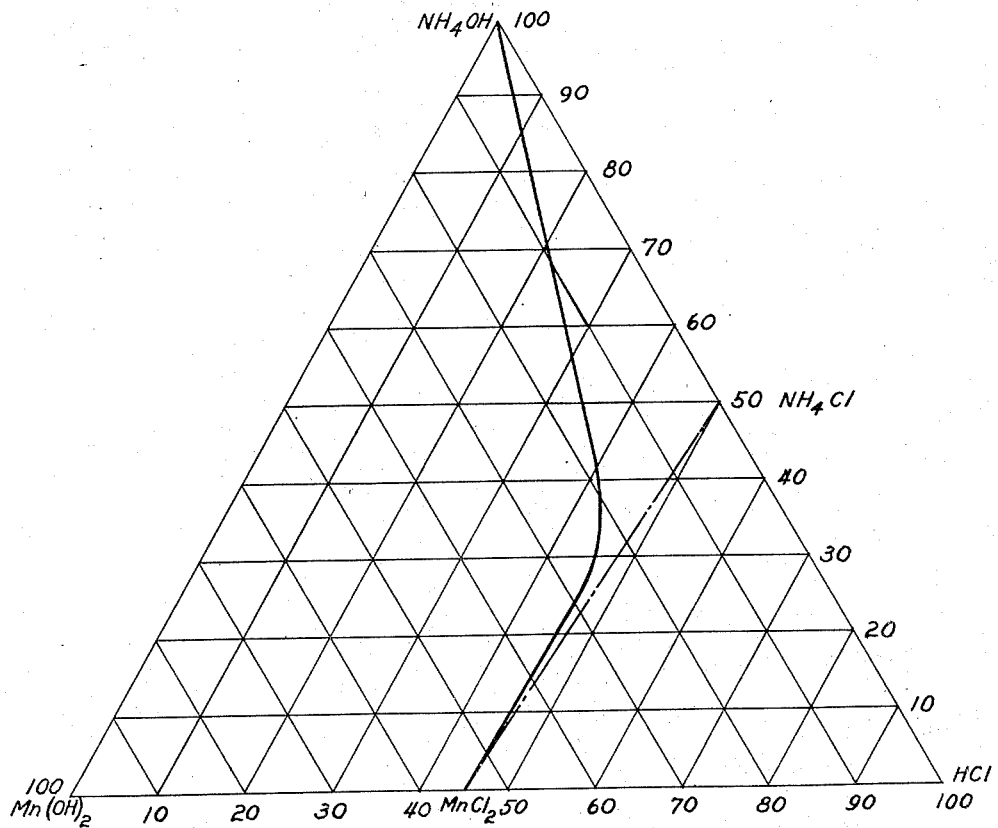
Fig. 1 is a ternary diagram representing the behavior of dilute solutions of manganous hydroxide, ammonium hydroxide and hydrochloric acid, the sum of the three components equalling 10 grams per liter dissolved in water at 25° C. and at atmospheric pressure.

The method of plotting concentration in Figure 1 is the standard one used by physical chemists for the representation of a ternary system on an equilateral triangle. Such a triangle has the property that the sum of the lengths of the three perpendiculars from any interior point to the three sides is equal to the height. If the height is taken as 100% and each of the perpendiculars drawn from any interior point to the sides of the triangle is equal to the concentration of the three components, each point in the interior of the triangle will correspond to a definite composition of the ternary system. It will be clear, however, that we are dealing with a system which can be represented in this manner only when all the solutions represented have the same total concentration; that is, in this sort of diagram we are plotting the concentrations of the three components other than water and in order to make the method of representation valid, the proportion of water to the total of the three components being plotted must be constant. In Figure 1 the total concentration of the three components is 10 grams per liter, the remainder being water. This method of plotting is more fully explained in standard texts, such as Ternary Systems by G. Masing, published by Reinhold Publishing Corporation.

Figure 2:
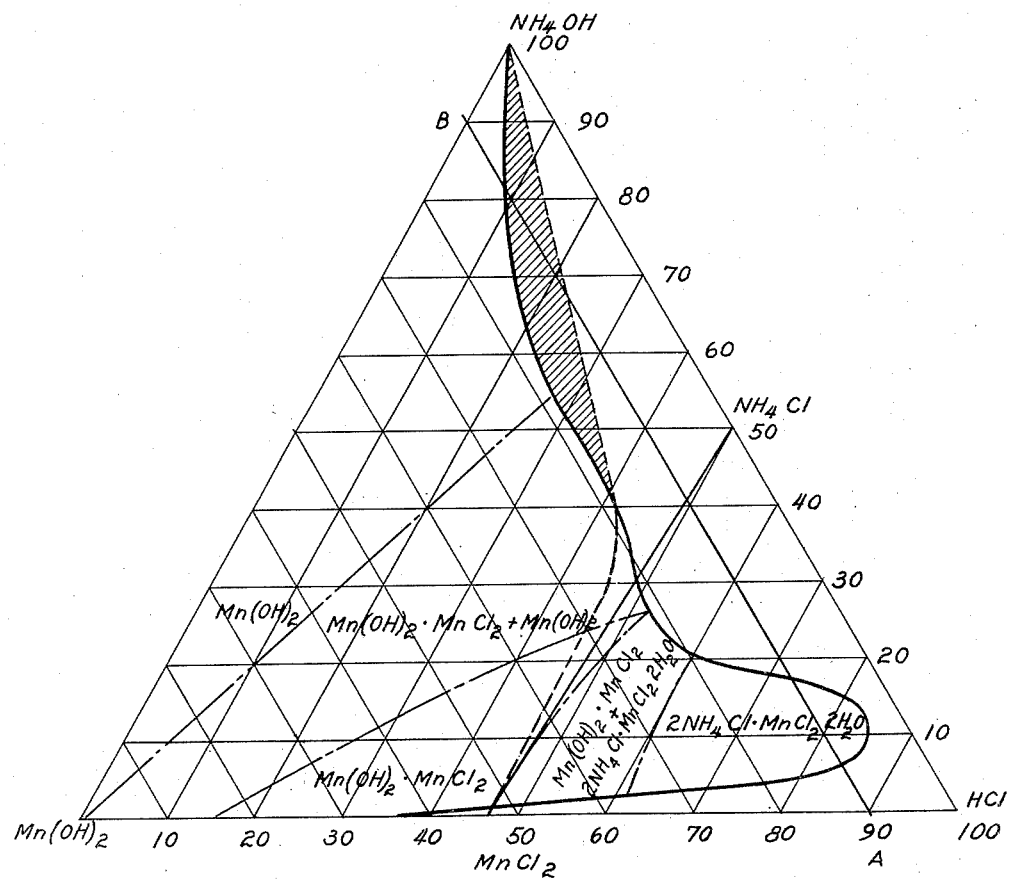
Fig. 2 is a ternary diagram of the same three components which are represented in Fig. 1 except that the sum of the three components equals 500 grams per liter dissolved in water at 25° C. and at atmospheric pressure.

If, now, the total concentration of the three components be increased to substantially more than 100 grams per liter, still at 25° C., the situation is depicted by the full line in Figure 2, which is for 500 grams total concentration, other than water. The dotted line is a repetition of the line of Figure 1 which represented very low concentrations. The changes from the conditions of Figure 1 in the system having 500 grams total concentration at low ammonia concentrations are due to the formation of basic and double salts as solid phases and need not now engage our particular attention. At concentrations of ammonium hydroxide of more than 40%, however, we see that the concentrations of the components at which manganous hydroxide precipitates are displaced toward the Mn(OH)₂—NH₄OH axis by the width of a composition field which has been cross-hatched in Figure 2. It is within this field that the new complex of this invention predominates.

It will presently be shown that the position and shape of this composition field is similar for all ternary systems forming the new complex. First, however evidence will be presented to show that within this field the manganese is present in a new combination with ammonia and an anion.

A critical difference between this solution and manganese ammonia solutions heretofore known with equivalent manganese concentrations is the absence of precipitation in the new solutions of the present invention on the addition of ammonium carbonate. None of the solutions of the new complex shows permanent precipitation when 1 cc. of freshly prepared saturated aqueous solution of technical ammonium carbonate is added to 10 cc. of the complex solution at a temperature of 25° C.

Another property of the solutions of this invention is the absence of precipitation when sulphide ion is added up to certain concentrations. The concentration necessary to produce precipitation depends on the manganese content. Within the composition range for the complex solutions of this invention, if the concentration of manganese is less than 10 grams per liter, an amount of sulphide at least equivalent to the manganese present may be added without the formation of a precipitate. With 50 grams per liter of manganese, up to 10% of the equivalent of manganese in the form of sulphide ion, may be added without the formation of a precipitate.

In further explanation of Figure 2, it will be evident that the full line divides the compositions represented by the diagram into those which form a complete solution and those which exhibit a solid phase. The solid phase in equilibrium with the solution depends on the particular composition. The fields in which the several solid phases are in equilibrium in this system are indicated by designated chemical compounds within areas delineated by dot-dash lines. These areas are only known approximately for the several systems investigated but are given in this and succeeding ternary diagrams as a guide to the solid phases which may exist in systems of this type.

The new solutions of the present invention are also characterized by their high pH together with high manganese content. The maximum pH which has been heretofore recorded without precipitation by addition of ammonia to solutions containing more than 20 grams of manganese per liter is about 8.5 regardless of the concentration of ammonium salts present. In the known art this has been stated as the upper limit of pH for clear aqueous solutions having the components, other than water, Mn(OH)₂, NH₄OH and HX, where HX represents such acids as hydrochloric, sulphuric or nitric. In the practice of the present invention it has been found that by proper proportioning of the components clear solutions within the pH range 8.5 to 10.5 may be formed. Such solutions may be formed in many ways as will hereinafter be disclosed. The solutions of this invention with pH=8.5 to 10.5 may be further alkalinized by the addition of sodium or potassium hydroxide up to pH=11 without precipitating manganese hydroxide. The amount of ammonia which must be added to increase the pH from 8.5 to 10.5 is proportional to the manganese content and is, therefore, relatively great when the manganese content is high. Such solutions are, therefore, highly buffered in the pH range 8.5 to 10.5 and relatively large amounts of acid or alkali are required to change the pH.

Figure 3:
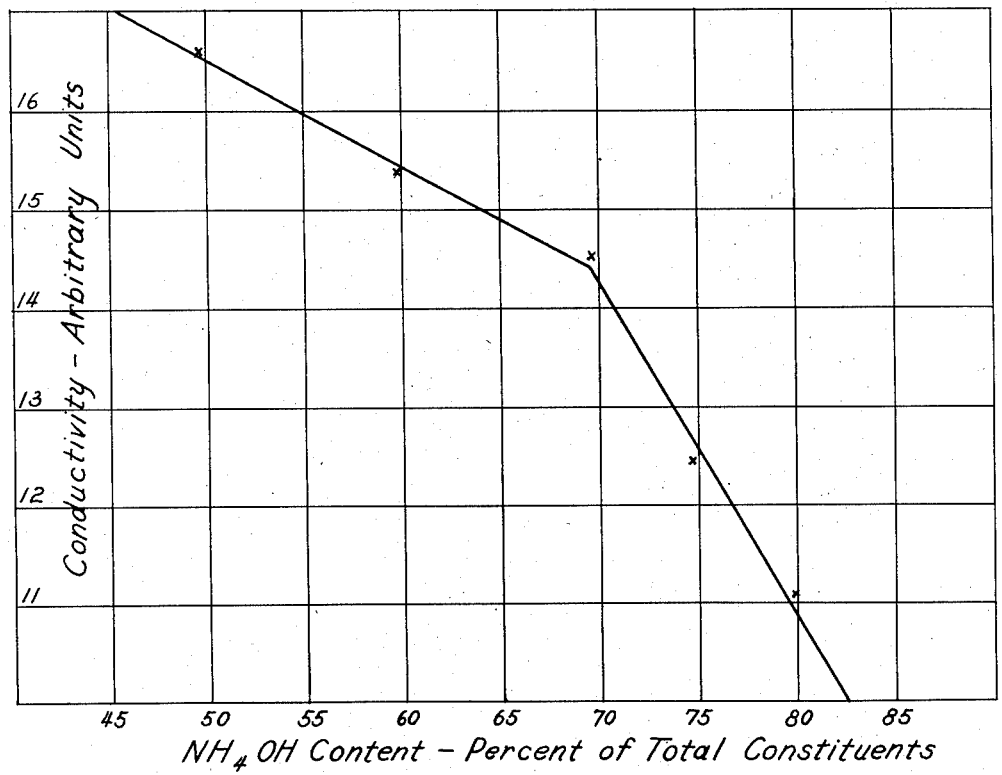
Fig. 3 is a plot of the electrical conductivity of a series of solutions with a constant concentration of manganese along the line A—B of Fig. 2.

Another property which clearly distinguishes the solutions within the indicated composition range is electrical conductivity. In Figure 3 has been plotted the electrical conductivity of a series of solutions along the line A—B in Figure 2, that is, solutions with a constant concentration of manganese. An examination of Figure 3 shows that at the composition corresponding to the boundary of the cross-hatched area there is a sudden increase in the rate at which conductivity falls off with increasing ammonium hydroxide concentration. This must be regarded as evidence of a change at this concentration in the character of the ions which conduct the electric current and, therefore, of a fundamental difference between the ions in solutions outside the cross-hatched area, which have been heretofore recognized and described, and in the new solutions defined herein for the first time.

An hypothesis has been formulated concerning the nature of the complex which predominates in compositions within the cross-hatched area and this hypothesis has been confirmed by certain experiments which will now be described. It will be clear, however, that the practice of the invention which will be set forth in even more detail hereinafter is in no way dependent on the validity of this hypothesis. It has been heretofore hypothesized by others and confirmed by experiment that $Mn(OH)_2$ ionizes in two ways:

(1)     $Mn(OH)_2 \rightleftharpoons Mn^{++} + 2OH^-$
(2)     $Mn(OH)_2 \rightleftharpoons HMnO_2^- + H^+$ It has further been hypothesized that the addition of ammonium salts to manganese salt solutions produces complex cations $Mn(NH_3)_n^{++}$ and that such cations decrease the ionization in accordance with Equation 1 above and increase the ionization according to Equation 2. I now hypothesize that with increasing ammonia concentrations the ionization in accordance with Equation 1 decreases to practically zero at the boundary of the cross-hatched area of Figure 2 and ionization takes place in accordance with Equation 3:

(3) 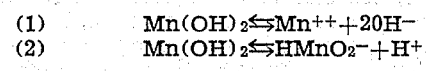

Stated in another way, the hypothesis offered is that the new complexes are characterized by the manganese being in a complex anion.

To test this hypothesis the movement of ions in an electrolytic transport apparatus was studied. It was found that in the solutions within the cross-hatched area of Figure 2 there was little movement of manganese to the cathode area and a definite movement of manganese toward the anode. In the examples studied, which included many systems hereinafter described, the movement of the manganese toward the cathode was in no case more than 10% of that toward the anode. It is, therefore, regarded as highly probable that the manganese ammonia complexes of the present invention are anionic.

By special means a solid compound which analyzes as follows: manganese 21.2, chlorine 54.9, ammonia 19.7, balance hydrogen and oxygen, may be separated from the complex solution described. This is accomplished by removing water but not ammonia from the solution, e. g., by placing the solution at 25° C. in a desiccator containing anhydrous calcium sulphate. The analysis is consistent with the formula

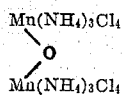

This compound dissolves to a clear solution in aqua ammonia but hydrolyzes in water. The relationship between this compound and the postulated complex anion in the solution of this invention may be as follows:

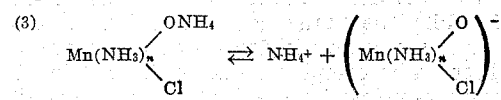

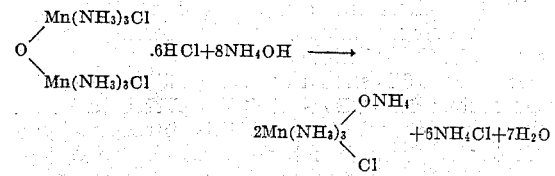

Examination of these crystals by X-ray spectrometry shows them to be a hitherto unknown compound having a tetragonal crystal structure with the following interatomic distances in Ångstrom units giving rise to the strong diffraction lines:

5.72, 4.09, 3.30, 3.27, 2.85, 2.82, 2.31, 2.13

The compound dissolves in dilute hydrochloric acid, each gram molecule neutralizing two equivalents of acid.

The formation of such a compound by crystallization from the complex solution of this invention is consistent with the presence in that solution of the postulated manganese-containing anion.

All of the properties of the complex solutions of this invention establish that the concentration of manganese ion in these solutions is less than that in a saturated aqueous solution of manganous hydroxide, namely about .002 gram per liter, and approximates that in a saturated aqueous solution of manganese sulphide, namely .0005 gram per liter, since the solutions do not form a precipitate with an amount of sulphide ion equivalent to the manganese when dilute with respect to manganese but do form a precipitate when relatively concentrated with respect to manganese.

The invention has so far been illustrated by the chloride system. As stated, other systems have a similar disposition of the composition range in which the anionic complex predominates. For convenience in considering the several embodiments of this invention the acidic components of the ternary systems may be divided into two groups depending on the solubility in water of their manganese salt. Group 1 consists of acids forming manganese salts at least as soluble as manganese sulphate, for example, HCl, $CH_3COOH$, $HNO_3$, $H_2S_2O_6$ and $HClO_4$. Group 2 consists of acids forming manganese salts less soluble than the sulphate, e. g., boric, naphthenic, benzoic, cinnamic and hydrosulphuric acids. These acids are in general less ionized in aqueous solution than those of Group 1. As a result of the low solubility of the salts and the buffering action of ammonium salts of weak acids, manganese oxide and manganese metal dissolve slowly in solutions of ammonia and acids of Group 2 and the complex solutions of this invention using such acids are more conveniently made by adding the acids to complex solutions of Group 1. By removing ammonia from such solutions the slightly soluble manganese salts of the acids of Group 2 are precipitated before the pH for the precipitation of manganous hydroxide is reached.

Figure 4:
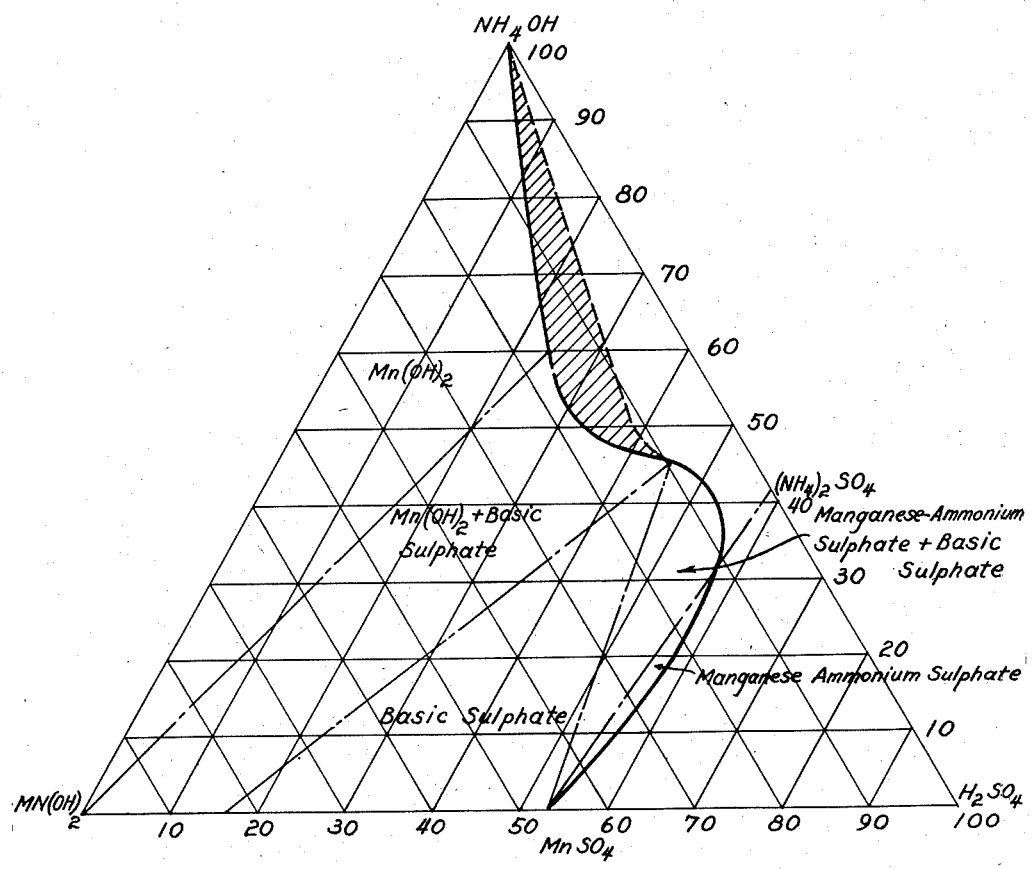
Fig. 4 is a ternary diagram representing the boundaries of the phase fields in the system, Mn(OH)₂—NH₄OH—H₂SO₄ with a total concentration of components equalling 500 grams per liter at 25° C. and at atmospheric pressure.

Some systems made up of acids of Group 1 will now be considered. In Figure 4 are shown the boundaries of the phase fields in the system $Mn(OH)_2$—$NH_4OH$—$H_2SO_4$ with a total concentration of 500 grams per liter. The phase fields for the several solid phases are located in an approximate way only. Their exact boundaries are not pertinent to the present invention which is concerned only with the cross-hatched field which shows the proportions of the constituents when the complex anion of this invention predominates over other forms of manganese in the solutions.

In Figure 5 is shown the composition range for the system $Mn(OH)_2$—$NH_4OH$—$HNO_3$ in which the complex solutions of this invention predominate. This has been cross-hatched. The phase fields of the several solid phases are given in an approximate way, as in previous figures. This figure is for a total concentration of the three components of 500 grams per liter at 25° C. and, like other figures, represents conditions at atmospheric pressure.

Figure 6 is made up in a manner entirely similar to that illustrated in Figure 5, the acid used being acetic.

The boundaries of the composition range in which the complex of this invention predominates have been established in these cases by the criteria heretofore set forth, namely, formation or lack of formation of a precipitate with a freshly prepared saturated solution of technical ammonium carbonate, relation of electrical conductivity to composition and electrolytic ion transport. There is no need to give here such data on the individual systems.

The acetate system deserves mention on account of its simplicity. This system is not complicated by solid phases of basic or double salts so that it approaches the behavior of a dilute solution except for the composition field in which the new complex predominates. The relationship of electrical conductivity to composition is also interesting because the conductivity in the solutions containing the cationic complexes increases with added ammonia so that on crossing the boundary into the composition area in which the anionic complex predominates there is an actual reversal of the relationship of conductivity to composition. This is particularly strong evidence of the sharp difference in the ionic composition of solutions within and without the cross-hatched area of this ternary diagram.

There is no need to multiply examples indefinitely to illustrate the invention. There is now given, however, a further example, namely, the ternary system

which, while falling in line with the general patterns established by the previous examples, has certain practically important differences. The ternary diagram of this system is given in Figure 7. The full line in this figure outlines the composition range in which the carbamate complex predominates; the dotted line outlines the composition range in which the carbonate complex predominates. The cross-hatched area represents the composition range for the system $Mn(OH)_2$—$NH_4OH$—$H_2CO_3$ in which the complex solutions of this invention predominate, while the dot-dash lines show the approximate location of the phase fields for the several solid phases. The system is characterized by the equilibrium reaction

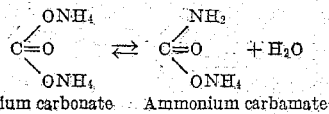

Ammonium carbonate   Ammonium carbamate

Since this equilibrium is displaced toward the right by increased ammonia concentration, the concentration of carbonate ion in the composition range of the complex anion of this invention is reduced and the complex is, therefore, probably in great measure:

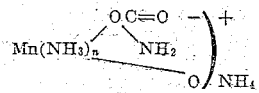

On heating or dilution the equilibrium shifts from the carbamate toward the carbonate and manganous carbonate separates when the carbonate ion has reached the necessary concentration.

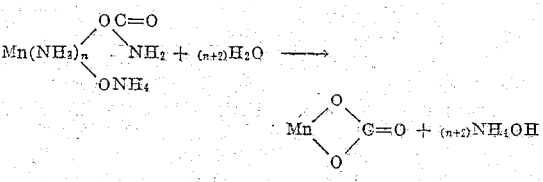

Since this system is in part made up of carbamic acid which forms a very soluble manganese salt, it is a sort of transition between systems made with acids of Group 1 and those of Group 2. Other examples of acids of Group 1 are dithionic, fluoboric, alkane sulphonic (M. W. 130), phenolsulphonic, fluosilicic, succinic, lactic, hydroxyacetic, thiocyanic and sulphamic. It will be obvious that mixtures of the anions discussed can be used without departing from the invention.

All of the systems of this invention have composition ranges in which the hypothesized anionic complex predominates, the boundaries of the composition range for the complex following the general pattern laid down in Figures 2, 4, 5, 6 and 7. That is, the solution with manganese predominantly in the anion contains a total concentration of more than 100 grams per liter of the components, the ammonia calculated as ammonium hydroxide is more than 40% of the total, while the manganese concentration expressed as manganese hydroxide exceeds 5 grams per liter. The complex solutions formed in all of these examples give the characteristic properties hereinbefore set forth for the complex. That is, 10 cc. of a solution of the complex does not form a permanent precipitate when 1 cc. of a freshly prepared saturated solution of technical ammonium carbonate is added, the movement of manganese toward the cathode in an electrolytic transport apparatus is less than one-tenth of the movement toward the anode and the relation of electrical conductivity to manganese content is different from that of an otherwise similar solution outside the composition range in which the manganese is present predominantly in the anion.

The examples given in Figures 2 to 7, inclusive, are for total concentrations of the three components of 500 grams per liter. This is near the upper practical limit for higher proportions of ammonia since a saturated solution of ammonia in water has only slightly more than this concentration of ammonia calculated as $NH_4OH$. With lower proportions of ammonia the total concentrations may be substantially higher. The practical lower limit of concentration for the complex solutions of this invention is about 100 grams per liter total concentration of the three components. Solutions of lower concentration tend to precipitate a solid phase irreversibly due to the great ease of oxidation of the precipitated solid phase when in the presence of such solutions. The higher concentrations of solution inhibit the oxidation of manganous hydroxide dispersed in them. In all the solutions of this invention, however, it is desirable to avoid oxidizing conditions. This may be conveniently done by adding a small amount of a suitable reducing agent.

Having now described the new complex solutions of this invention and set forth the properties by which the new solutions can be recognized, illustrative examples of the methods of preparing these complex solutions are given as follows:

Example 1

I take 164 grams of $MnCl_2.2H_2O$ and dissolve in 1 liter of water. Into this solution I pass gaseous ammonia at 25° C. and atmospheric pressure, air being excluded. The solution becomes at first turbid and then a voluminous precipitate forms. At this stage the pH of the solution is 8.2. I continue to add ammonia until the precipitate dissolves. The pH of the resulting solution is 9.3. An analysis of the solution in terms of the three components, $Mn(OH)_2$, HCl and $NH_4OH$, shows the proportions in grams per liter of solution $Mn(OH)_2$ 89, HCl 73, $NH_4OH$ 311, for a total concentration of 473 grams per liter. In terms of percent of the total of the three dissolved constituents this is $Mn(OH)_2$ 18.8%, HCl 15.4% and $NH_4OH$ 65.8%. If to 10 cc. of this solution is added 1 cc. of a freshly prepared saturated solution of technical ammonium carbonate, no precipitate is formed.

Example 2

I take 490 grams of $Mn(C_2H_3O_2)_2.4H_2O$ and dissolve in concentrated aqua ammonia at room temperature and pressure to make 1 liter. The resulting solution has a pH of 9.8 and on analysis shows the following proportions in grams per liter: 178 $Mn(OH)_2$, 240 $CH_3COOH$ and 520 $NH_4OH$, for a total concentration in grams per liter of 938. In terms of percent of the total of the three dissolved constituents this is $Mn(OH)_2$ 19.0%, $CH_3COOH$ 25.6% and $NH_4OH$ 55.4%. This solution, when subjected to electrolysis in an electrolytic transport apparatus, shows a migration of manganese to the anode about nine times the amount which migrates to the cathode in the same experiment.

Example 3

I take 55 grams of powdered electrolytic manganese and add it to one liter of concentrated aqua ammonia to which has been added 150 grams $(NH_4)_2SO_4$, all at 25° C. and atmospheric pressure. The manganese metal dissolves rapidly with the evolution of hydrogen. The resulting clear solution has a pH of 9.5. On analysis this solution shows the following composition in grams per liter: 89 $Mn(OH)_2$, 98 $H_2SO_4$ and 520 $NH_4OH$ for a total concentration of 707 grams per liter. In terms of percent of the total of the three dissolved constituents this is $Mn(OH)_2$ 12.6%, $H_2SO_4$ 13.8% and $NH_4OH$ 73.6%. The electrical conductivity of this solution is 4.8 in the arbitrary units used in Figure 3. This compares with an electrical conductivity of about 6.2 for a solution otherwise identical but containing 50% $NH_4OH$ instead of 73.6% as in the solution of the present example.

Example 4

I take 100 grams pulverized electrolytic manganese and add 250 grams commercial ammonium carbonate, 200 cc. water and 800 cc. concentrated aqua ammonia at 25° C. and atmospheric pressure. The ammonium carbonate does not dissolve readily and the whole is thoroughly stirred. The manganese metal then goes into solution with the evolution of hydrogen and, unavoidably, some ammonia. The resulting solution has a pH of 10.0 and is stable for a period of several hours at room temperatures or for several days at 20° C. This solution on analysis shows the following proportions in grams per liter: $Mn(OH)_2$ 160, $H_2CO_3$ 125, $NH_4OH$ 400, for a total of 685 grams per liter. In terms of percent of the total of the three dissolved constituents this is $Mn(OH)_2$ 23.4%, $H_2CO_3$ 18.2% and $NH_4OH$ 58.4%. When this solution is treated with $H_2S$ in an amount equivalent to 10% of the manganese present, no precipitate is formed; when an amount of $H_2S$ equivalent to the manganese is added, there is a precipitate of pink manganese sulphide.

Example 5

I take 69 grams of commercial high carbon ferromanganese (containing about 80% manganese) in the form of 100 mesh powder. I stir this in a solution of 125 grams of $NH_4Cl$ in one liter of concentrated aqua ammonia at ordinary room temperature and pressure. The ferromanganese dissolves with the evolution of hydrogen and the resulting solution, after filtration to remove the undissolved residue, has a pH of 9.5 and analyzes as follows in grams per liter: $Mn(OH)_2$ 86, $Fe(OH)_2$ 4.2, HCl 83.5, $NH_4OH$ 425. This solution is stable in the complete absence of oxygen but oxidizes on exposure to air with great ease and rapidity with the formation of colloidal ferric hydroxide. Such a solution has uses based on its ease of oxidation but for the purposes of the present invention it is desirable to remove the iron. This may be done by stirring solution with manganese dioxide. The rapidity of this reaction depends on the manganese dioxide used. In any case, however, the presence of a small amount of copper salts greatly accelerates the reaction. I prefer, therefore, to carry out the preparation of the solutions of my invention from ferromanganese in accordance with the following example.

Example 6

I take 69 grams of the same commercial ferromanganese used in Example 5 and stir this with a solution of 125 grams of $NH_4Cl$ in 1 liter of concentrated aqueous ammonia to which has been added 7.5 grams of 90% synthetic manganese dioxide and 0.1 of a gram of cupric chloride.

The ferromanganese dissolves, as in Example 5, and after filtration to remove the undissolved residue the solution analyzes: $Mn(OH)_2$ 88.5 grams, $Fe(OH)_2$ trace, HCl 83.5 grams, $NH_4OH$ 425 grams.

Example 7

I take 50 grams of freshly precipitated $Mn(OH)_2$ and stir it at room temperature and pressure with 1 liter of concentrated aqua ammonia to which has been added 106 grams of $NH_4CNS$. The resulting solution has a pH of 9.4 and analyzes in grams per liter: $Mn(OH)_2$ 50, HCNS 59, $NH_4OH$ 500, for a total of 609 grams, or in terms of percent of the three constituents, $Mn(OH)_2$ 8.2%, HCNS 9.7%, $NH_4OH$ 82.1%. If to 10 cc. of this solution is added 1 cc. of a saturated solution of freshly prepared technical ammonium carbonate, no precipitate is formed. This solution is similar to the solution of Example 4.

Example 8

I take 100 grams of pulverized electrolytic manganese and mix it with 1 liter concentrated aqua ammonia. Into this mixture, with stirring, I pass carbon dioxide, all at room temperature and pressure. The metallic manganese dissolves with the evolution of hydrogen and the solution after complete solution of the manganese contains $Mn(OH)_2$ 160 grams, $H_2CO_3$ 106 grams, $NH_4OH$ 480 grams, for a total of 746 grams. In terms of percent of the total of the three dissolved constituents this is $Mn(OH)_2$ 21.4%, $H_2CO_3$ 14.2% and $NH_4OH$ 64.4%.

Example 9

I take 87 grams MnO and stir with a liter of aqueous solution containing 70% $NH_4OH$. Into this mixture I pass $CO_2$ at room temperature and pressure. Solution is slow and incomplete. After 30 minutes stirring the solution, after filtration, contained 61 grams of $Mn(OH)_2$, 345 grams of $NH_4OH$ and 118 grams of $H_2CO_3$.

Example 10

The procedure and materials in this example are exactly the same as those in Example 9 except that .25 of a gram per liter hydroxylamine acid sulphate was added at the outset. The solution was rapid and after 15 minutes of stirring the solution contained 86.2 grams of $Mn(OH)^2$, 345 grams of $NH_4OH$ and 124 grams of $H_2CO_3$ per liter, making a total of 555.2 grams. Expressed in terms of percent of the dissolved constituents this is $Mn(OH)_2$ 15.5%, $H_2CO_3$ 22.4% and $NH_4OH$ 62.1%.

Example 11

The procedure and materials of this example are exactly the same as in Example 10 except that .25 of a gram of sodium sulphide was added. The solution contained 86.8 grams of $Mn(OH)_2$, 345 grams of $NH_4OH$ and 123 grams of $H_2CO_3$, making a total of 554.8 grams. Expressed in terms of percent of the dissolved constituents this is $Mn(OH)_2$ 15.7%, $H_2CO_3$ 22.1% and $NH_4OH$ 62.2%. This solution is similar to that of Example 4.

Example 12

The procedure and materials in this example were the same as in Example 10 except that .30 of a gram of $FeSO_4 \cdot 7H_2O$ was added. The solution contained 87.0 grams of $Mn(OH)_2$, 344 grams of $NH_4OH$, 125 grams of $H_2CO_3$ and a trace of iron. Expressed in terms of percent of the dissolved constituents this is $Mn(OH)_2$ 15.8%, $H_2CO_3$ 22.1% and $NH_4OH$ 62.1%. This solution is similar to that of Example 4.

Example 13

I take 87 grams of MnO and stir at room temperature and pressure with a liter of solution containing 200 grams of commercial ammonium carbonate and 70% $NH_4OH$ to which has been added 0.20 of a gram of $H_2S$. The resulting solution contained 86.8 grams of $Mn(OH)_2$, 378 grams of $NH_4OH$ and 118 grams of $H_2CO_3$, for a total of 582.8 grams. Expressed in terms of percent of the dissolved constituents this is $Mn(OH)_2$ 14.9%, $H_2CO_3$ 20.2% and $NH_4OH$ 64.9%. This solution is similar to the solution of Example 4.

Example 14

I take 87 grams of $MnO_2$ 200 grams of $NH_4Cl$, 140 grams of $NH_2OH \cdot HCl$ and 1 liter of concentrated aqueous ammonia and stir for 30 minutes. The resulting solution analyzes 86.2 grams of $Mn(OH)_2$, 138 grams of HCl and 516 grams of $NH_4OH$, for a total of 740.2 grams. Expressed in terms of percent of the dissolved constituents this is $Mn(OH)_2$ 16.7%, HCl 26.7% and $NH_4OH$ 56.6%. This solution is similar in properties to that of Example 1.

Example 15

I take 121.6 grams of $MnH_4(BO_3)_2$ and dissolve in concentrated aqua ammonia. The resulting solution does not form a precipitate on the addition of a freshly prepared saturated solution of technical ammonium carbonate.

Example 16

I take 547 grams of the complex compound heretofore described as having the probable formula

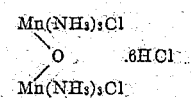

and dissolve in a liter of an aqueous solution containing 24% $NH_3$. The resulting solution does not form a precipitate when 1 cc. of a 1% solution of colorless ammonium sulphide is added to 10 cc. of the solution. It does, however, form a precipitate when 5 cc. of the ammonium sulphide solution is added.

The illustrative examples given have all been carried out at or near room temperature and pressure. This is the preferred procedure. It has been found, however, that, with the exception of the carbonate system where temperature has a profound effect on the carbamate-carbonate equilibrium, the only effect of temperature and pressure within the range 0° C. to 60° C. and 0.1 to 2 atmospheres is the indirect effect on the ammonia concentration which can be maintained in the solution.

The complex solutions which can be prepared in accordance with the illustrative examples just given have many uses. The following examples are given as illustrative of methods of preparing manganese compounds from these solutions.

Example 17

I take one liter of a solution prepared in accordance with Example 1 and boil this solution under vacuum to remove ammonia. I continue to boil and remove ammonia from this solution until the pH of the solution has decreased to 7.3.

I then filter the solution to recover the separated solid. The total weight of solid separated from the solution by this procedure is 72 grams. The analysis of the air dried solid is 63% manganese and 19% chlorine. Drying is accomplished at 100° C. with only a little oxidation.

*Example 18*

I take a liter of solution prepared in accordance with Example 1 and proceed exactly as in Example 17 up to the point of separating the precipitate. I treat this precipitate by stirring with 2 liters of a solution of ammonia in water containing 5 grams per liter of $NH_3$. The solid is again separated from the liquid and dried in vacuum. This dried precipitate is $Mn(OH)_2$. The recovered solution contains ammonia and ammonium chloride.

*Example 19*

I take a liter of solution prepared in accordance with Example 2 and place it in a closed chamber with 2000 grams of anhydrous calcium sulphate or other desiccant inert toward ammonia, as alumina. Water from the solution is absorbed by the calcium sulphate and crystals formed in the solution. These crystals have the following analysis: manganese 15.7%, ammonia 14.6%, acetic acid 67.7%. This analysis is consistent with a composition:

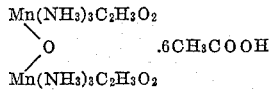

They are tetragonal in crystal structure and one gram equivalent of the crystals neutralizes two equivalents of HCl.

*Example 20*

I take a liter of solution prepared in accordance with Example 3 and pass into this solution 95 grams of $CO_2$ at 25° C. The resulting solution is heated to 60° C. for one hour and the resulting precipitate of manganese carbonate is filtered off. There are obtained 124.5 grams of precipitated manganese carbonate which after air drying analyzes: manganese 44.3%, carbon dioxide 35.4% and water 7.26%. An examination of this precipitate by X-ray spectrometry and by optical means establishes that it is made up of individual crystals of $MnCO_3$ having the crystal structure of rhodochrosite and a crystal size of 1–2 microns.

*Example 21*

I take one liter of a solution prepared in accordance with Example 4 and boil this solution under vacuum for 15 minutes. The precipitated $MnCO_3$ is filtered off and, after air drying, found to weigh 225 grams. Analysis, optical and X-ray examination establishes this $MnCO_3$ to be identical to that prepared in Example 20.

*Example 22*

I take one liter of solution prepared in accordance with Example 2 and add 200 grams of naphthenic acid. I boil this solution at atmospheric pressure for 15 minutes to remove 278 grams of ammonia. Manganese naphthenate precipitates as a viscous mass which solidifies on cooling. The solidified naphthenate weighs 287 grams.

*Example 23*

I take a solution prepared in accordance with Example 11. Such solution will be free of any heavy metals incidentally present in the MnO, including copper, iron, zinc, etc. I pass 25 grams of $H_2S$ into this solution at room temperature and pressure producing a precipitate of pink manganese sulphide. This sulphide is separated from the liquid by filtration. The solution contains about 15 grams per liter of manganese and a small amount of sulphide ion. This solution is suitable for re-use in accordance with Example 11.

*Example 24*

I take a liter of solution made from 10 grams anhydrous $MnCl_2$ in water saturated with $NH_3$. To this I add 2.7 grams of $H_2S$. No precipitate is formed. I boil this solution at atmospheric pressure to remove ammonia and to reduce the pH to 7.3. Manganese sulphide is quantitatively precipitated as a granular easily filtered precipitate.

It will be clear that the preparation of manganese hydroxide in accordance with Example 18 can be carried out in a cyclic manner to manufacture manganese hydroxide from either metallic manganese, ferromanganese or reduced manganese ore containing manganous oxide. The reactions starting with manganous oxide for a cyclic process are shown in Figure 8.

All of the systems which may be used for the preparation of manganous hydroxide in this way belong to Group 1.

With systems made from acids belonging to Group 2 the slightly soluble compound is precipitated on boiling rather than manganous hydroxide. In view of the weakly acidic character of acids of Group 2 it is preferable to prepare the complex system from an acid of Group 1 and then add the desired acid of Group 2 and boil to remove ammonia and precipitate the slightly soluble salt of the acid of Group 2. This is illustrated in Examples 20, 22 and 24. The carbonate-carbamate system is a special case because here we may use for making the solution an acid of Group 1, carbamic acid, and then form within the solution itself the acid of Group 2, carbonic acid. In view of the practical importance of this system a detailed example will be given of the practice of this invention for the production of manganese carbonate from manganese ore by a cyclic process.

*Example 25*

To 4 liters of commercial aqua ammonia (28% $NH_3$) there are added 600 grams of commercial ammonium carbonate, and the mixture is allowed to stand overnight at a temperature of 20° C. To this solution are added 400 grams of well-reduced manganese ore, approximately 85% 200 mesh, the ore assaying 63.4% manganese in the form of manganous oxide. This mixture is charged into a sealed vessel equipped with an agitator. Air is displaced with a current of nitrogen and the slurry is agitated for 40 minutes. At the end of this leaching period it is filtered on a large Buchner funnel, the pulp is washed with aqua ammonia, and filtrate and cake are weighed and assayed. Extraction is 75% for the reduced manganese, somewhat less for the total manganese.

In the above procedure the step of digesting the commercial ammonium carbonate with the aqua ammonia at 20° C. for a considerable period is for the purpose of insuring that the transformation from carbonate to the equilibrium mixture between carbonate and carbamate is substantially complete. This step may not be necessary in all cases as commercial ammonium carbonate contains variable portions of carbamate and it is frequently possible to use the commercial carbonate directly with success. The transformation of the carbamate-carbonate mixture to a solution containing essentially carbonate is to be avoided since this transformation tends to precipitate manganese carbonate prematurely. In any case the solution prepared by leaching the reduced manganese ore in accordance with the above example should not be allowed to stand for a longer time than necessary otherwise some carbonate precipitation may take place. Other factors which increase the tendency for carbonate precipitation are high temperature, dilution and the presence of an excess of reduced manganese ore. Accordingly, in order to get the best results in the leaching step, the total concentration of dissolved salts and ammonia should be kept as high as possible, the temperature not substantially above room temperature and the contact time kept to a minimum by adequate stirring. While temperatures lower than room temperature tend to prevent precipitation, they also reduce the reaction rate and, therefore, a compromise must be sought between increased stability of the carbamate and decreased reaction rate. It has been found that the best temperature range is from 25° to 35° C. It should be pointed out the reaction proceeds with some slight evolution of heat so that starting with a cold solution will usually result in the best extraction. In the present example the oxidation caused by air is prevented by use of a nitrogen atmosphere. Other expedients may be used which will be obvious to those skilled in the art. For example, a little metallic manganese may be added along with the ore so as to provide a hydrogen atmosphere.

In order to recover the manganese from solution, as made in the present example, it is conveniently heated to the boiling point, any ammonia evolved being collected for re-use. Heating for a period of 15 minutes brings about quantitatively precipitation of the manganese as carbonate. This carbonate has the analysis and other characteristics set forth in Example 20.

It will be clear that the production of manganous carbonate from manganous oxide in this way can be used for the manufacture of this compound in a cyclic manner from manganese ores in which the manganese has been reduced to manganous oxide. The ammonia, which is evolved, is absorbed and added to the solution from which the manganous carbonate has been removed by filtration and the carbon dioxide removed as manganese carbonate is replaced.

The cyclic production of such slightly soluble manganese compounds as manganese borate, manganese salicylate and manganese naphthenate is possible by a procedure analogous to that described for the carbonate except that a complex with an acid of Group 1, other than carbamic, is made and the desired acid of Group 2 added.

Example 26

As a further example, manganese naphthenate is prepared as follows: 100 grams of manganous oxide and 200 grams of ammonium chloride are dissolved in 1 liter of strong ammonia and to this solution is added 250 grams of naphthenic acid. After thorough mixing, the solution is boiled to remove the ammonia which is absorbed for re-use. This boiling precipitates the manganese naphthenate as a viscous liquid which on cooling solidifies to a waxy mass which is separated from the solution containing ammonium chloride and some manganese chloride. This solution, together with the recovered ammonia, is now ready to dissolve another batch of MnO so that the process may be operated cyclically to produce manganese naphthenate from MnO and naphthenic acid, or from a reduced manganese ore and naphthenic acid.

What is claimed is:

1. A new crystalline compound containing manganese, hydrogen, ammonia, oxygen and an anion X in the proportion represented by:

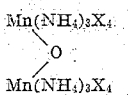

where X is an univalent anion, having a tetragonal crystal structure and a basicity of two equivalents per gram molecule.

2. An aqueous solution, free from solid phase, containing an equilibrium mixture of three components, other than water, $Mn(OH)_2$, $NH_4OH$ and HX, where X is an anion forming a manganese salt at least as soluble in water as manganous sulphide, the manganese content of the solution being in excess of 10 grams per liter calculated as manganous hydroxide and occurring predominantly in an anion, and said solution having a free ammonium hydroxide content by weight at least equal to 40% of the total of the three components, other than water, and sufficient in amount to prevent the formation of a permanent precipitate upon addition of 1 cc. of a saturated ammonium carbonate solution to 10 cc. of said manganese-containing solution, the solution being further characterized in that it contains substantially more than 150 grams per liter of the three components in toto and an amount of anion X at least equivalent to the manganese content.

3. The aqueous solution defined in claim 2 further characterized by the acid HX being hydrochloric acid.

4. The aqueous solution defined in claim 2 further characterized by the acid HX being sulphuric acid.

5. The aqueous solution defined in claim 2 further characterized by the acid HX being nitric acid.

6. The aqueous solution defined in claim 2 further characterized by the acid HX being acetic acid.

7. The aqueous solution defined in claim 2 further characterized by the acid HX being carbamic acid.

8. Process of preparing, from a manganese-containing material in which the manganese content is predominantly in a form selected from the group consisting of metallic manganese and manganous oxide, an aqueous solution of an ammonio-complex of manganese containing manganese in a complex anion which comprises extracting the manganese-containing material with an aqueous ammoniacal leaching solution of an ammonium salt of an acid HX, where X is an anion forming a manganese salt at least as soluble in water as manganous sulphide, said solution being made from in excess of 50 grams of $NH_3$ per liter and an amount of said acid at least stoichiometrically equivalent to the manganese which is to be extracted whereby to produce an aqueous solution which, when free from solid phase, consists essentially of an equilibrium mixture of three components, other than water, $Mn(OH)_2$, $NH_4OH$ and HX, in which manganese-containing solution the manganese occurs predominantly in an anion and the manganese content, calculated as $Mn(OH)_2$, is in excess of 10 grams per liter, the content of the three components other than water is substantially in excess of 150 grams per liter, the ammonia content of said solution calculated as ammonium hydroxide is by weight at least equal to 40% of the total of the three components other than water and sufficient in amount to prevent the formation of a permanent precipitate upon addition of 1 cc. of a freshly prepared saturated ammonium carbonate solution to 10 cc. of said manganese-containing solution at 25° C., and the content of anion X is at least stoichiometrically equivalent to the manganese content.

9. The process defined in claim 8 further characterized by the acid HX being hydrochloric acid.

10. The process defined in claim 8 further characterized by the acid HX being sulphuric acid.

11. The process defined in claim 8 further characterized by the acid HX being nitric acid.

12. The process defined in claim 8 further characterized by the acid HX being acetic acid.

13. The process defined in claim 8 further characterized by the acid HX being an equilibrium mixture of carbonic and carbamic acid.

14. Process of producing, from a manganese-containing material in which the manganese content is predominantly in a form selected from the group consisting of metallic manganese and manganous oxide, a manganous compound MnY having a water solubility of from 0.0006 g./l. to 53.2 g./l., which comprises preparing an aqueous solution of an ammonio-complex of manganese containing manganese in a complex anion by extracting the manganese-containing material with an aqueous ammoniacal leaching solution of an ammonium salt of an acid HX, where X is an anion forming a manganese salt at least as soluble in water as manganous sulphide, said solution being made from in excess of 50 grams of $NH_3$ per liter and an amount of said acid at least stoichiometrically equivalent to the manganese which is to be extracted whereby to produce an aqueous solution which, when free from solid phase, consists essentially of an equilibrium mixture of three components, other than water, $Mn(OH)_2$, $NH_4OH$ and HX, in which manganese-containing solution the manganese occurs predominantly in an anion and the manganese content, calculated as $Mn(OH)_2$, is in excess of 10 grams per liter, the content of the three components other than water is substantially in excess of 150 grams per liter, the ammonia content of said solution calculated as ammonium hydroxide is by weight at least equal to 40% of the total of the three components other than water and sufficient in amount to prevent the formation of a permanent precipitate upon addition of 1 cc. of a freshly prepared saturated ammonium carbonate solution to 10 cc. of said manganese-containing solution of 25° C., and the content of anion X is at least stoichiometrically equivalent to the manganese content, and removing ammonia from the resulting solution in the presence of the anion Y of the desired manganous compound, thereby precipitating MnY.

15. Process as defined in claim 14, in which the anion Y is —OH, and in which manganous hydroxide is precipitated by removing ammonia from the solution by boiling the latter.

16. Process defined in claim 14, in which the anion Y is —OH and in which the hydroxide precipitate is separated from the solution and is treated with an aqueous solution of ammonia to dissolve contained anion X and the resulting solution separated from the solid.

17. Process defined in claim 14, in which the anion Y is the carbonate ion $=CO_3$, and in which the carbonate ion is produced in situ by dissociation of the carbamate ion present in the solution.

18. The process defined in claim 14 in which the anion Y is the naphthenate ion.

19. The process defined in claim 14 in which the anion Y is the borate ion.

REGINALD S. DEAN.

REFERENCES CITED

The following references are of record in the file of this patent:

UNITED STATES PATENTS

| Number | Name | Date |
| --- | --- | --- |
| 1,889,021 | Kobe | Nov. 29, 1932 |
| 1,932,413 | Laury | Oct. 31, 1933 |
| 1,951,341 | Bradley | Mar. 20, 1934 |
| 2,122,735 | Bellone | July 5, 1938 |
| 2,459,714 | Moulton | Jan. 18, 1949 |

OTHER REFERENCES

Lange, "Handbook of Chemistry," 4th Ed., page 168, publ. by Handbook Publishers, Inc., Sandusky, Ohio (1941).

Mellor, "Comprehensive Treatise on Inorganic and Theoretical Chemistry," vol. 12, page 359, 434, Longmans, Green, and Co., N. Y. C. (1932).